United States Patent
Madni et al.

(10) Patent No.: US 6,520,031 B2
(45) Date of Patent: Feb. 18, 2003

(54) NON CONTACTING TORQUE SENSOR

(75) Inventors: Asad M. Madni, Los Angeles, CA (US); Jim B. Vuong, Northridge, CA (US); Robert K. Hansen, Burbank, CA (US)

(73) Assignee: BEI Sensors & Systems Company, Inc., Sylmar, CA (US)

( * ) Notice: Subject to any disclaimer, the term of this patent is extended or adjusted under 35 U.S.C. 154(b) by 0 days.

(21) Appl. No.: 09/935,374

(22) Filed: Aug. 22, 2001

(65) Prior Publication Data
US 2002/0000129 A1 Jan. 3, 2002

Related U.S. Application Data

(63) Continuation-in-part of application No. 09/527,088, filed on Mar. 16, 2000, now abandoned, and a continuation-in-part of application No. 09/390,885, filed on Sep. 7, 1999, now Pat. No. 6,304,076.

(51) Int. Cl.⁷ .............................. G01L 3/12; G01L 3/14; G01B 7/00
(52) U.S. Cl. .............................. 73/862.326; 324/207.17
(58) Field of Search .................. 73/862.326; 324/207.17

(56) References Cited

U.S. PATENT DOCUMENTS 4,465,959 A * 8/1984 Yajima ........................ 318/685
4,874,053 A * 10/1989 Kimura et al. ............... 180/443
4,969,098 A * 11/1990 Leising et al. ............... 477/150
5,394,760 A * 3/1995 Persson et al. ........... 73/862.325
5,406,155 A * 4/1995 Persson ....................... 310/171
6,304,076 B1 * 10/2001 Madni et al. ................ 318/660

FOREIGN PATENT DOCUMENTS

EP         1083408 A2 *  3/2001          G01D/5/20

OTHER PUBLICATIONS

Gingrich.http://www.phys.ualberta.ca/~gingrich/phys395/notes/node126.html Exclusive OR Gate.*

* cited by examiner

*Primary Examiner*—Max Noori
*Assistant Examiner*—Lilybett Martir
(74) *Attorney, Agent, or Firm*—Coudert Brothers LLP

(57) ABSTRACT

A non contacting angular differential displacement torque sensor utilizes a split shaft with a connecting torsion bar with a pair of receive disks each with an intervening coupler disk carrying a conductive attenuating pattern where the inductive coupling between transmit and receive disks is individually attenuated in accordance with the angular position of the shaft on which the disks are mounted. The pair of receive disks which receive signals from a common transmitter have their angular difference taken and this is the actual torque on the shaft.

7 Claims, 5 Drawing Sheets

NON CONTACTING TORQUE SENSOR

RELATED APPLICATION

This application is a continuation-in-part of application Ser. No. 09/527,088 filed Mar. 16, 2000, entitled "NON-CONTACTING TORQUE SENSOR" now abandoned and a continuation-in-part of a application Ser. No. 09/390,885, filed Sep. 7, 1999 entitled, "ANGULAR POSITION SENSOR WITH INDUCTIVE ATTENUATING COUPLER" and now U.S. Pat. No. 6,304,076.

INTRODUCTION

The present invention is directed to a non contacting torque sensor and specifically for a sensor that is especially useful for the steering columns of automobiles and other vehicles.

BACKGROUND OF THE INVENTION

The never-ending demand for higher efficiency and higher reliability in automobiles, and the advent of the electrical vehicle (EV), have collectively doomed power hungry devices such as the Power Steering Hydraulic Pump and the Air Conditioning compressor. The best replacement for the Hydraulic Pump at this time is an electric motor to directly assist the steering effort. The problem now lies with reliably sensing the driver-applied torque so as to know how much steering assist to add. This could be accomplished with potentiometers, but the limited life of the contacting wipers is unacceptable in this very critical application. Another possibility is the use of optical encoders. While this would also perform the function, it is prohibitively expensive (especially absolute optical encoders), and the use of the light source is discouraged due to reliability considerations.

There is already known a device for sensing angular position or rotation of a steering column, as disclosed in application Ser. No. 09/390,885, filed Sep. 7, 1999 entitled Angular Position Sensor With Inductive Attenuating Coupler assigned to the present assignee and now U.S. Pat. No. 6,304,076. This patent application is hereby incorporated by reference.

OBJECT AND SUMMARY OF THE INVENTION

It is a general object of the present invention to provide an improved torque sensor and one of the non contacting type.

In accordance with the above invention there is provided a non contacting torque sensor for a shaft having a torsion bar connecting two portions of the shaft comprising a transmit annular disk surrounding the shaft and fixed for non rotation. A pair of annular coupler disks are mounted for rotation with the shaft on opposite sides of the torsion bar. A pair of fixed receiver annular disks surround the shaft with the coupler disks between them, the pair of receiver disks receiving signals from the transmit disk through the coupler disks indicative of the rotation of the shaft. Means are provided for angularly comparing the signals from the pair of receive disks to provide a torque signal indicative of the angular differential displacement of the shaft portions.

DETAILED DESCRIPTION OF THE PREFERRED EMBODIMENTS

Figure 1:
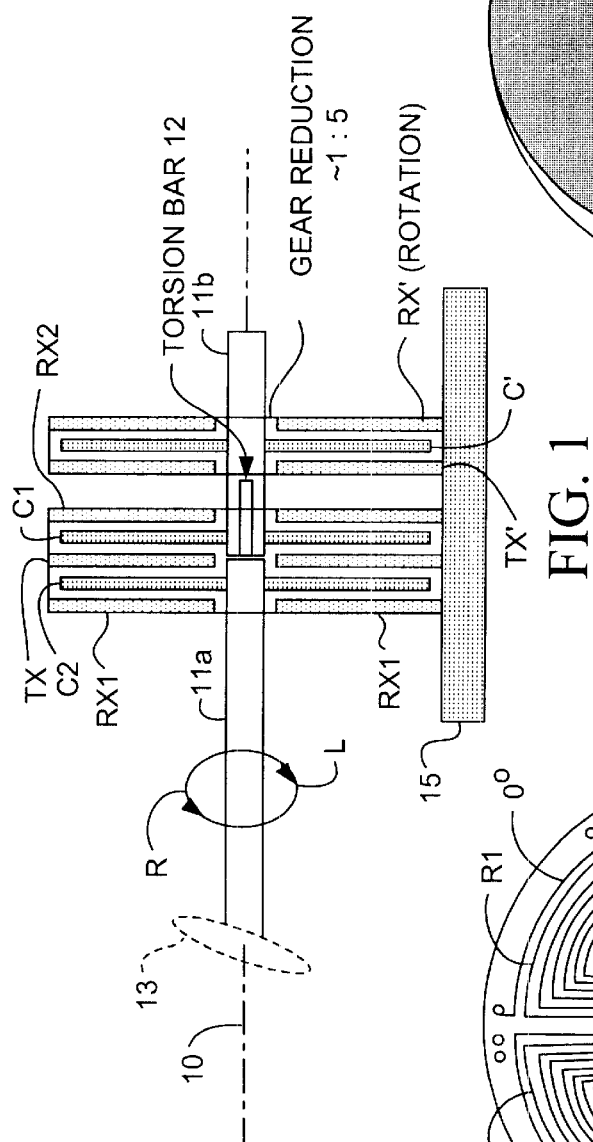
FIG. 1 is a side elevation view of a sensor incorporating the present invention.
Figure 3:
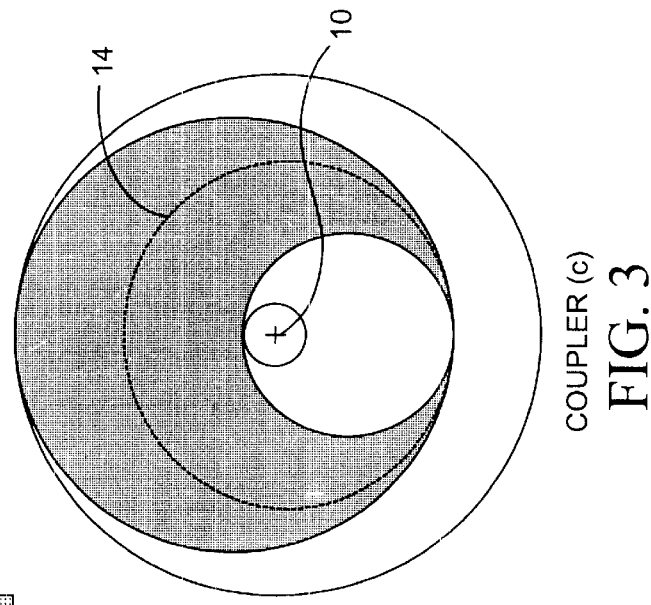
FIG. 3 is a plan view of another portion of FIG. 1.

Referring now to FIG. 1 the axis 10 includes a shaft divided into a first portion 11a and a second portion 11b connected by a torsion bar 12. The shaft in the preferred embodiment would be driven by a nominally represented steering wheel 13. Mounted for rotation with and fixed to shaft portion 11a is a coupler disk C2. On shaft portion 11b, there is mounted a coupler disk C1 and also C'. All of these are represented as coupler disk C illustrated in FIG. 3. It is a disk made of insulating material such as plastic and includes a crescent-shaped symmetrical conductive pattern 14. The pattern and its use is discussed in the above co-pending patent application. All of the coupler disks are essentially identical. However, coupler disk C' is coupled to shaft portion 11b with a reduction gear (not specifically shown) with a 1:5 gear reduction. Thus in the case of a steering column of an automobile which may have a so-called lock to lock turn rotational distance of 2.25 turns, this gear reduction provides for a effective rotation of less than 360°. The output of this portion of the sensor that is C', TX' and RX' provides a measure of the angular rotation of the shaft in accordance with the above-mentioned patent application.

Figure 2:
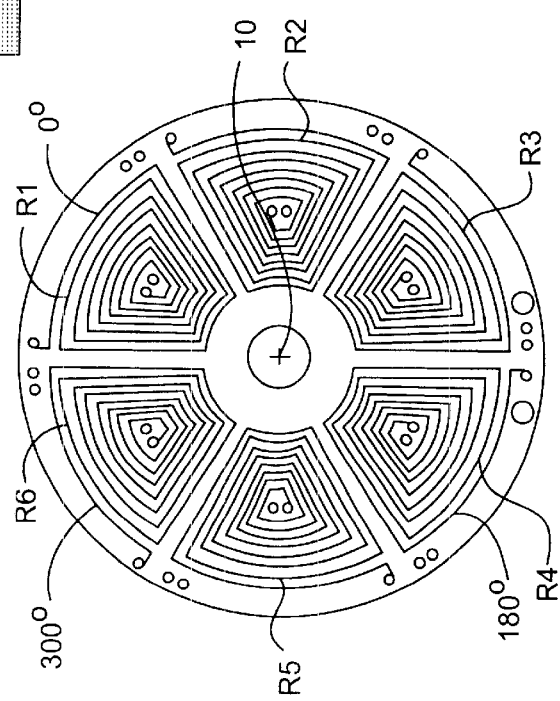
FIG. 2 is a plan view of portions of FIG. 1.

Fixed to a base 15, also in the form of an annular disk in relation to shafts 11a and 11b are transmit and receive disks RX1, RX2, TX, RX1' and TX'. All are illustrated in FIG. 2. All of the disks consist of six spiral loop antenna patterns designated 1 through 6 which are segmentally arranged in a circular pattern around the disk and circling the disk for a full 360°. Thus each coil in the form of a spiral loop antenna has been deformed to provide a 60° segment. The above patent application describes this in greater detail.

Figure 5:
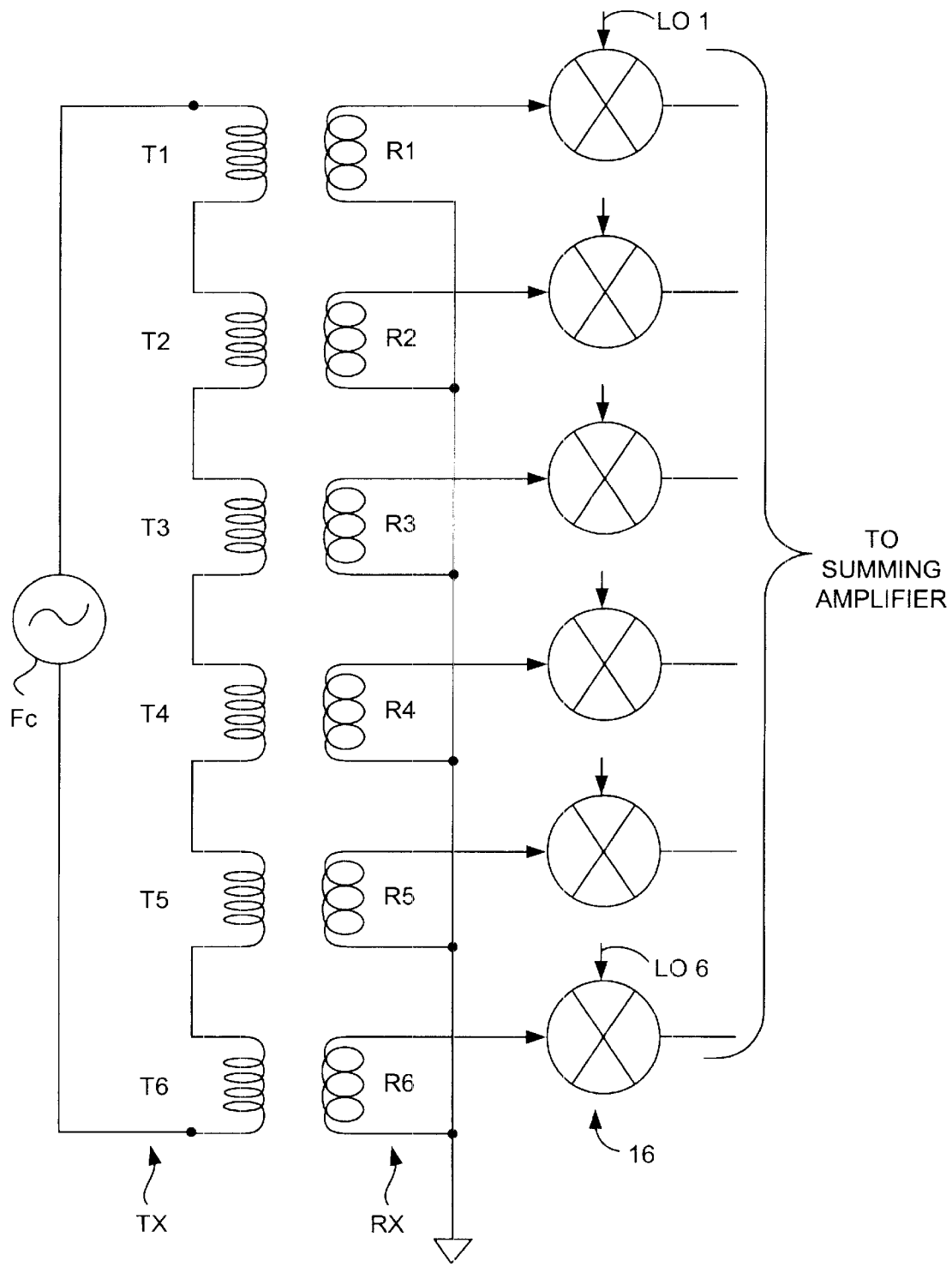
FIG. 5 is a more detailed schematic of a portion of FIG. 4.

FIG. 5 is a circuit diagram indicating how the receiver and transmit coils on disks RX and TX, the respective coils being labeled T1–T6, R1–R6 are inductively coupled to each other. This inductance is attenuated by either the couplers C1 or C2 or C'. An oscillator or signal source 17 supplies a signal, $F_c$, to the coils of the transmit disk TX. Since the coupler disk will interrupt and attenuate the signal amplitudes based on the coupler pattern with respect to the position of each receiver coil, six different amplitude signals are simultaneously generated at any one angular position of the coupler. These are demodulated in the mixer 16 by six different local oscillator signals L01–L06 which are shifted in phase from one another by 60°. They are then summed as will be explained below, to produce an instantaneous sinusoidal wave form, the phase of the wave form being proportional to the coupler's rotational position. Thus, by sensing the sequence of phase shifts, the rotation or angular position of the shaft can be measured as discussed in the above co-pending application. In addition, as will be discussed below, along with this rotational measurement, if a pair of measurements are taken on opposite sides of a torsion bar, the two output signals will indicate the same approximate degree of rotation, but with any phase difference being a measure of angular differential displacement of the two portions of the shaft.

Figure 4:
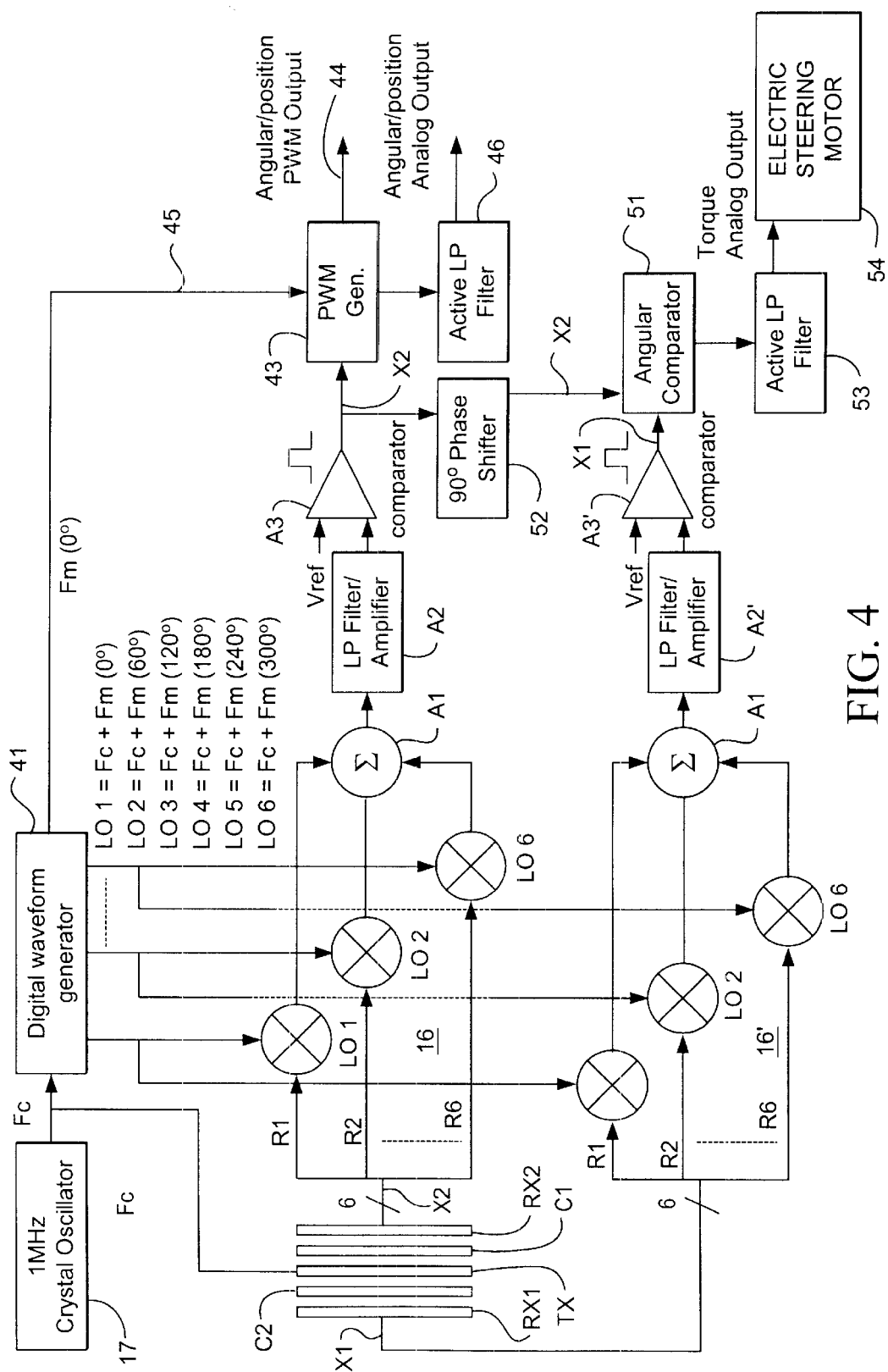
FIG. 4 is a simplified circuit schematic incorporating FIGS. 1, 2 and 3 illustrating the present invention.

FIG. 4 illustrates this in complete detail, which shows the various receivers, transmitters and couplers RX, TX and C. These are driven in a manner as in FIG. 5, by a 1 Mhz crystal oscillator 17 which drives a digital wave form generator 41. It's six output lines designated L01–L06 provide the six local oscillator signals which are shifted in phase from one another by 60°. These drive the six mixers 16 which are summed at summing amplifier A1. A low pass filter amplifier A2 drives a comparator A3 which turns the sinusoidal wave into a square wave X2 to drive a pulse width modulating generator 43 to provide on output line 44 a pulse width modulated (PWM) angular position output signal. When X2 is compared with a 0° reference signal on line 45, the PWM angular position signal results. This is all discussed in the above pending patent application where the PWM generator is an RS flip flop. An analog output is also derived from a filter 46. This is all from the X2 output side from the RX2 receive disk.

For the RX1 receive disk there is a similar mixer unit 16', low pass filter A2' and comparator A3' to produce an X1 square wave related to the position of the shaft.

Figure 7:
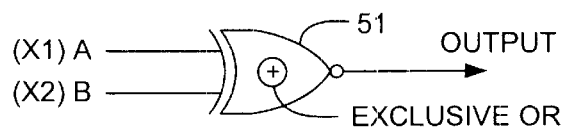
FIG. 7 is a circuit schematic of an OR gate of FIG. 7 along with an explanatory table.
Figure 7:
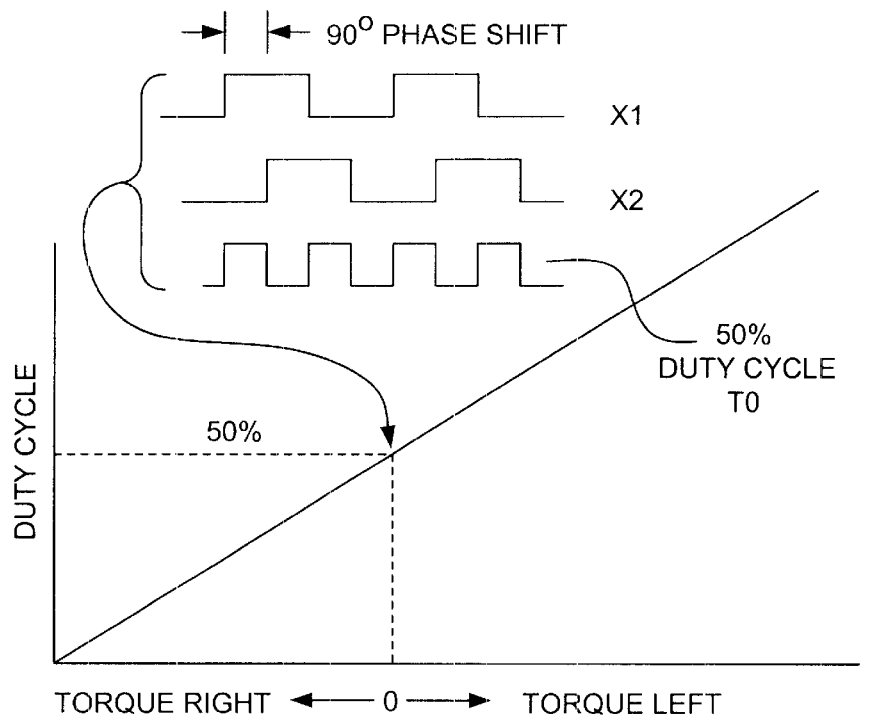

The X2 square wave is shifted 90° by a 90° phase shifter 52, both for preventing cross-over ambiguity at a 0° rotational position (where one coupler may be at 355° and the other at +5°) and at the same time to provide a simplified computational technique for clockwise and counter-clockwise (right and left) torque on the steering wheel. A 90° shift is preferred, but some other phase shift would work equally as well, for example 60°. The angular comparator 51 is illustrated in FIG. 7 as an exclusive OR gate with the X1 and X2 inputs and operating in a manner so that only when there is a differential input is there an output, which is typical of exclusive OR gates. The output of this OR gate is filtered at 53 to provide a analog torque signal which may drive, for example, the electric steering motor of an automobile or other appropriate actuator device.

In summary, the torque signal is provided by and is proportional to the differential phase shift between X1 and X2. This is, of course, as discussed above a measure of the angular differential displacement of the two portions of the shaft.

Figure 6:
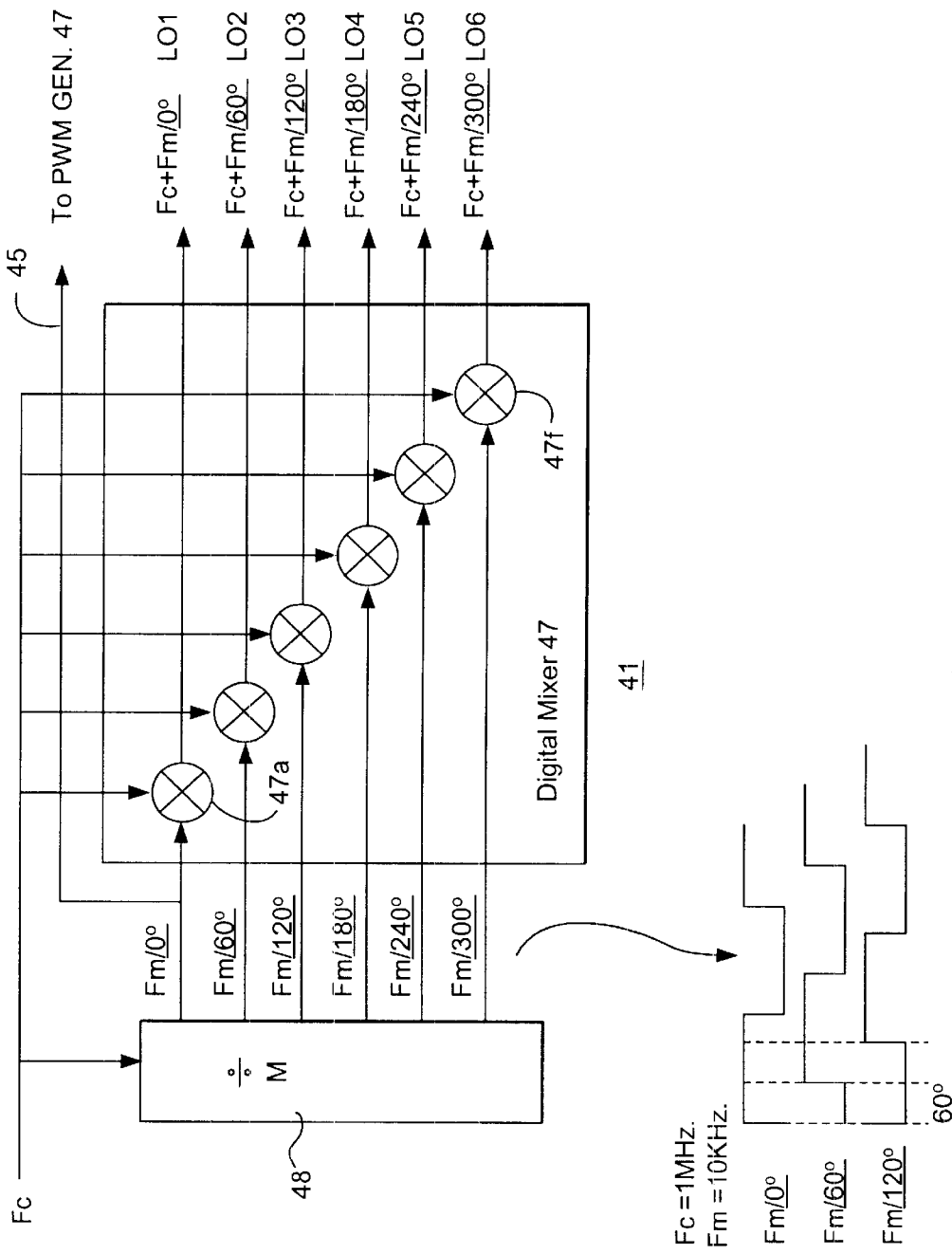
FIG. 6 is a more detailed circuit schematic of a portion of FIG. 4.

The digital waveform generator 41 of FIG. 4 is shown in greater detail in FIG. 6 where a divide by M Unit 48 provides 60° phase shifted signals $F_m$ which drive the respective mixers 47a–47f which also have the $F_c$ signal source as input to provide the final output signals.

Figure 8:
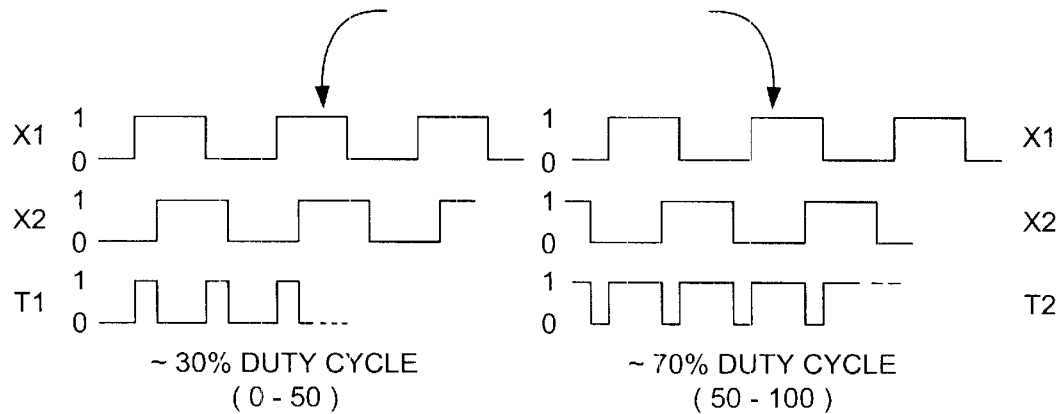
FIG. 8 is a characteristic curve along with explanatory timing diagram wave forms illustrating the operation of the present invention.

FIG. 8 illustrates the operation of the invention by a characteristic curve where at 0 torque the X1 and X2 signals are exactly phase shifted 90° (by 90° phase shifter 52) to produce an output waveform having a 50% duty cycle at zero torque. If the phase shift were different, for example 60°, then this would be a slightly different duty cycle. However, it is believed that the 90° phase shift providing the 50% duty cycle aptly and simply allows the electrical circuitry to provide a left and right torque in an efficient manner. In other words, the 90° phase shift causes the signal X1 to fall in the center of X2 at zero torque. For example, for torque right the associated waveforms show that the X2 square wave is shifted toward X1 from 50% down to 0%, the proportion of the shift or that duty cycle is indicated by the waveform T1, as 30% (for example) to provide a linear indication of torque. Similarly for the torque left, the T2 curve is the result of the leading or lagging of X2 relative to X1 where the duty cycle is shown as 70% but may vary, of course, from 50% to 100% in a linear manner to illustrate the left-handed or counter-clockwise torque. Thus, the duty cycle or torque signal varies in a manner proportionate to the lead or lag of the two couplers. A typical differential angular displacement range of a drive shaft is ±8° to ±12°. Thus the X1 and X2 signals would never cross over at the 180° point. Since the two receiver units RX1 and RX2 share the common transmitter, TX, there is very little error in the measurement process.

As an alternative to the duty cycle and square wave comparison of X1 and X2, as illustrated in FIG. 4, is an analog angle comparison of analog output 46 with a similar analog output (not shown) of processed signal X1. But, without extensive signal processing, it would suffer greatly during the ambiguous transitioning period from 359° to 0°, where one is 359°, and the other is perhaps 3°. The elegant solution was to simply compare X1 and X2 square waves so that there never is any transition. However, in some applications an analog comparison may be feasible.

The foregoing technique of FIG. 8 may also be mathematically proved by realizing that each RX1 and RX2 receive signals that have both a rotational component $\omega$ and an angular displacement component $\theta$. Assume that the RX1 output has an angular position $\theta_a$ and the RX2 output has an angular position $\theta_b$ with reference to 0°.

Then the respective intermediate frequency (IF) signals X1 and X2 are:

$$X1 = IF_1 = \tfrac{1}{2}A\,\cos(\omega_o t - \theta_a) \tag{1}$$

$$X2 = IF_2 = \tfrac{1}{2}A\,\cos(\omega_o t - \theta_b) \tag{2}$$

$$IF = IF_1 - IF_2 = \tfrac{1}{2}A[\cos(\omega_o t - \theta_a) - \cos(\omega_o t - \theta_b)] \tag{3}$$

$$IF = \tfrac{1}{2}A(\cos \omega_o t \cos \theta_a + \sin \omega_o t \sin \theta_a - \cos \omega_o t \cos \theta_b - \sin \omega_o t \sin \theta_b) = \tfrac{1}{2}A[\cos \omega_o t(\cos \theta_a - \cos \theta_b) + \sin \omega_o t(\sin \theta_a - \sin \theta_b)] \tag{4}$$

Let $$\sin \Phi = \sin \theta_a - \sin \theta_b$$

and $$\cos \Phi = \cos \theta_a - \cos \theta_b \tag{5}$$

Then (4) becomes, $$IF = \tfrac{1}{2}A(\cos \omega_o t \cos \Phi + \sin \omega_o t \sin \Phi) \tag{6}$$

Equation (6) reduces to $$IF = \tfrac{1}{2}A\,\cos(\omega_o t - \Phi) \tag{7}$$

where:

$$\Phi = \tan^{-1}[(\sin \theta_a - \sin \theta_b)/(\cos \theta_a - \cos \theta_b)] = \text{torque component}$$

Thus the present invention provides a true non-contacting differential angular displacement (torque) sensor.

What is claimed is:

1. A non contacting torque sensor for a shaft having a torsion bar connecting two portions of said shaft comprising:
   a transmit annular disk surrounding said shaft and fixed for non rotation and generating a radio frequency (RF) signal;
   a pair of annular coupler disks mounted for rotation with said shaft on opposite sides of said torsion bar with said transmit disk between them;
   a pair of fixed receiver annular disks surrounding said shaft with said coupler disks between them, said pair of receiver disks receiving radio frequency signals from said transmit disk through said coupler disks indicative of the rotation of said shaft;

and means for angularly comparing said respective signals from said pair of receiver disks to provide a torque signal indicative of the angular differential displacement of said shaft portions.

2. A torque sensor as in claim 1 where both of said signals received by said receiver disks have the same duty cycle with a phase shift between them proportional to the rotational differential displacement of said pair of coupler disks.

3. A torque sensor as in claim 2 where said angular comparing of said phase shifted signals provides an output signal with a changing duty cycle which is proportional to the differential displacement of one coupler disk from the other whereby said torque signal is indicated.

4. A non contacting torque sensor as in claim 3 where said angular comparison is made by an exclusive OR gate whereby for clockwise or counter-clockwise rotation of the shaft said duty cycle respectively decreases or increases with respect to increase of torque.

5. A non contacting torque sensor as in claim 1 including means for shifting phase of one of said receiver signals by a fixed angle before said angular comparing whereby crossover ambiguity is prevented.

6. A non contacting torque sensor as in claim 5 where said fixed angle is 90° and a zero torque signal has a 50% duty cycle.

7. A non-contacting torque sensor as in claim 1 where said coupler disks provide a pair of RF attenuated sinusoidal waveforms to said receiver disks whose phase is proportional to the angular position of the coupler whereby the difference in positions is indicative of said angular differential displacement.

* * * * *